US008139885B2

(12) United States Patent
Hsu

(10) Patent No.: US 8,139,885 B2
(45) Date of Patent: Mar. 20, 2012

(54) METHOD AND APPARATUS FOR IMAGE STABILIZATION

(75) Inventor: Yu-Po Hsu, Sanchong (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1148 days.

(21) Appl. No.: 11/987,086

(22) Filed: Nov. 27, 2007

(65) Prior Publication Data

US 2008/0240589 A1 Oct. 2, 2008

(30) Foreign Application Priority Data

Mar. 28, 2007 (TW) .............................. 96110695 A

(51) Int. Cl.
*G06K 9/40* (2006.01)

(52) U.S. Cl. ........ 382/260; 382/294; 382/264; 382/107; 348/154; 348/155; 348/208.4; 348/402.1; 348/416.1

(58) Field of Classification Search .................. 382/294, 382/260, 264, 107; 348/154–155, 208.4, 348/208.13, 413.1, 402.1, 416.1
See application file for complete search history.

(56) References Cited

U.S. PATENT DOCUMENTS

| | | | | | |
|---|---|---|---|---|---|
| 5,157,732 | A * | 10/1992 | Ishii et al. | ...................... | 382/107 |
| 5,473,379 | A * | 12/1995 | Horne | ...................... | 375/240.16 |
| 5,682,205 | A * | 10/1997 | Sezan et al. | ...................... | 348/452 |
| 5,748,231 | A * | 5/1998 | Park et al. | ................. | 348/207.99 |
| 5,774,183 | A * | 6/1998 | Riek et al. | ................. | 375/240.16 |
| 6,078,618 | A * | 6/2000 | Yokoyama et al. | ............ | 375/240 |
| 6,122,319 | A * | 9/2000 | Lee et al. | ................. | 375/240.16 |
| 6,778,605 | B1 * | 8/2004 | Hamanaka | ............... | 375/240.16 |
| 6,809,758 | B1 * | 10/2004 | Jones | ....................... | 348/208.99 |
| 7,221,390 | B1 * | 5/2007 | Kutka | ......................... | 348/208.4 |
| 7,433,497 | B2 * | 10/2008 | Chen | ......................... | 382/107 |
| 7,489,341 | B2 * | 2/2009 | Yang et al. | ............... | 348/208.99 |
| 7,605,845 | B2 * | 10/2009 | Batur | ........................ | 348/208.6 |
| 7,656,424 | B2 * | 2/2010 | Bouzar | ........................ | 348/149 |
| 7,705,884 | B2 * | 4/2010 | Pinto et al. | ............... | 348/208.99 |
| 7,755,667 | B2 * | 7/2010 | Rabbani et al. | ............. | 348/208.6 |
| 7,855,731 | B2 * | 12/2010 | Yu | ............................ | 348/208.6 |
| 7,880,769 | B2 * | 2/2011 | Qi | ............................ | 348/208.99 |
| 8,009,971 | B2 * | 8/2011 | Koo et al. | .................... | 396/55 |
| 2004/0001147 | A1 * | 1/2004 | Vella et al. | ............... | 348/208.99 |
| 2004/0027454 | A1 * | 2/2004 | Vella et al. | .................... | 348/155 |
| 2006/0017814 | A1 * | 1/2006 | Pinto et al. | ................. | 348/208.4 |
| 2006/0044404 | A1 * | 3/2006 | Hatanaka | .................... | 348/208.4 |
| 2006/0274156 | A1 * | 12/2006 | Rabbani et al. | .......... | 348/208.99 |
| 2007/0076982 | A1 * | 4/2007 | Petrescu | ....................... | 382/294 |
| 2007/0206678 | A1 * | 9/2007 | Kondo | ..................... | 375/240.17 |

FOREIGN PATENT DOCUMENTS

| | | | |
|---|---|---|---|
| EP | 589643 A1 * | 3/1994 | |
| JP | 8-331430 | 5/1995 | |
| JP | 08331430 | * 12/1996 | |

OTHER PUBLICATIONS

Head pose tracking—devices, Li et al., Mobility 07, ACM 978-159593-819-0, pp. 572-575.*

* cited by examiner

*Primary Examiner* — Jayesh A Patel

(74) *Attorney, Agent, or Firm* — Thomas|Kayden

(57) ABSTRACT

An image stabilization method and an image stabilization device for processing a target image in a video stream are provided. A target accumulated global vector of the target image is first calculated. Then, a low-pass filtering procedure is performed on the target accumulated global vector to generate a final motion vector. Subsequently, the target image is adjusted based on the final motion vector. Thereby, the target image is stabilized.

12 Claims, 8 Drawing Sheets

METHOD AND APPARATUS FOR IMAGE STABILIZATION

BACKGROUND OF THE INVENTION

1. Field of the invention

The present invention relates to image processing techniques, and in particular, to methods and apparatuses for image stabilization.

2. Description of the prior art

Unavoidably, when a user takes motion pictures with a digital video recorder, the motion pictures may be blur due to unstable hands or tripods, which makes viewers uncomfortable. To solve this problem, some digital video recorders have the function of image stabilization.

A motion picture (also called a video stream) is composed of plural successive images. To compensate the shakes, an image stabilization mechanism must determine a motion vector (i.e. the degree of shakes) between an image and its previous image. Generally, image stabilization mechanisms divide an image into plural blocks and respectively calculate a local motion vector (LMV) for each of the blocks.

FIG. 1(A) and FIG. 1(B) show an example of two successive images. In this exemplary video stream, the image 10B shown in FIG. 1(B) follows the image 10A shown in FIG. 1(A). Assume there is a circular object in the scene taken by the photographer. Theoretically, if both the positions of the circular object and the photographer remain steady, the image of the circular object should appear at the same place in the images 10A and 10B.

As shown in FIG. 1(A) and FIG. 1(B), the image of the circular object appears respectively in the block 12A of the image 10A and the block 12B of the image 10B. By comparing FIG. 1(A) and FIG. 1(B), it can be seen that the image of the circular object appears at the different locations in the images 10A and 10B. Based on the positions of the circular image, an image stabilization mechanism can obtain the LMV of the block 12B compared with the block 12A. The LMV of each of the blocks can be calculated in a similar way.

Generally, image stabilization mechanisms generate a global motion vector (GMV) of the image 10B by gathering statistic of the LMVs of all the blocks in the image 10B. The GMV is one of the factors for an image stabilization mechanism to adjust the image 10B. Traditional image stabilization mechanisms adjust the image 10B according to the following equation:

$$CMV_{10B}(t) = AGMV_{10B}(t) = D*AGMV_{10A}(t-1) + GMV_{10B}(t) \quad \text{(Equation 1)}$$

The parameters t and (t−1) in Equation 1 are used for indicating the sequential relationship of images. The image 10B is corresponding to a time, t; the image 10A is corresponding to a previous time step, (t−1). $GMV_{10B}(t)$ represents the GMV of the image 10B. $AGMV_{10B}(t)$ represents an accumulated global motion vector (AGMV) corresponding to the image 10B. $AGMV_{10B}(t)$ is the sum of $GMV_{10B}(t)$ and the AGMV corresponding to the image 10A (i.e. $AGMV_{10A}(t)$). The parameter D in Equation 1 is a damping factor and generally in the range of 0.875~0.995. $CMV_{10B}(t)$ is the final motion vector of the image 10B; a traditional image stabilization mechanism adjusts the image 10B according to $CMV_{10B}(t)$.

For example, if $CMV_{10B}(t)$ is "three pixels toward right", to compensate this shift, an image stabilization mechanism should correspondingly adjust the center of the image 10B toward left with the distance equal to three pixels. With the damping factor (D), the CMV of the video stream will be gradually converged to zero if the digital video recorder is not continuously shaken. After being adjusted by the above mechanism, if the user does not move, the centers of the images in the video stream should be approximately the same.

FIG. 2(A)~FIG. 2(C) respectively illustrate an exemplary AGMV generated under different conditions. The AGMV in FIG. 2(A) generally appears when the digital video recorder is unintentionally shaken, i.e. not moved by a user. In reality, the user himself/herself may walk or run around while taking motion pictures, which could cause the change of the AGMV. The AGMV in FIG. 2(B) generally appears when the digital video recorder is simultaneously shaken and moved by a user. The AGMV in FIG. 2(C) generally appears when the digital video recorder is moved but not shaken by a user.

The drawback of prior arts is that traditional image stabilization mechanisms (i.e. those adopt Equation 1) only provide compensations to the shakes shown in FIG. 2(A); the movement of photographers is not considered. Therefore, when a photographer moves the digital video recorder intentionally, the images in the video stream might not faithfully reflect the movement; unnatural interruptions and shifts may exist therein.

SUMMARY OF THE INVENTION

To solve the aforementioned problem, the invention provides methods and apparatuses for image stabilization. In the methods and apparatuses according to the invention, the concept of low-pass filtering is adopted; high frequency components (due to shaking) in AGMV are filtered off and low frequency components are retained.

One embodiment, according to the invention, is an image stabilization method for processing a target image in a video stream. In the method, a target accumulated motion vector corresponding to the target image is first calculated. Subsequently, a low-pass filtering procedure is performed on the target accumulated motion vector to generate a final motion vector. Then, the target image is adjusted based on the final motion vector. Thereby, the target image is stabilized.

Another embodiment, according to the invention, is an image stabilization apparatus for processing a target image in a video stream. The apparatus includes a calculating module, a filtering module, and an adjusting module. The calculating module is used for calculating a target accumulated motion vector corresponding to the target image. The filtering module performs a low-pass filtering procedure on the target accumulated motion vector to generate a final motion vector. The adjusting module then adjusts the target image based on the final motion vector.

Moreover, in the methods and apparatuses according to the invention, at least two stabilization procedures can be provided. Therefore, the methods and apparatuses can first judged whether a digital video recorder is under shaking or moving while taking motion pictures, and then automatically select the most suitable stabilization procedure for the digital video recorder.

The advantage and spirit of the invention may be understood by the following recitations together with the appended drawings.

BRIEF DESCRIPTION OF THE APPENDED DRAWINGS

FIG. 1(A) and FIG. 1(B) show an example of two successive images.

FIG. 2(A)~FIG. 2(C) respectively illustrate an exemplary AGMV generated under different conditions.

DETAILED DESCRIPTION OF THE INVENTION

Figure 3A:
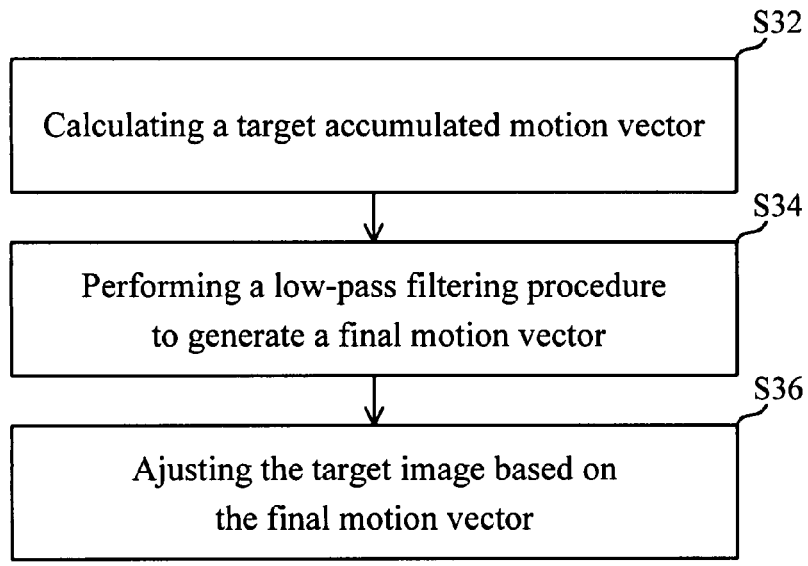
FIG. 3(A) illustrates a flowchart of the image stabilization method in the first embodiment according to the invention.

The first embodiment, according to the invention, is an image stabilization method for processing a target image in a video stream. Please refer to FIG. 3(A), which illustrates the flowchart of this method. In the method, a target accumulated motion vector (AGMV(t)) corresponding to the target image is first calculated in step S32. Subsequently, in step S34, a low-pass filtering procedure is performed on AGMV(t) to generate a final motion vector (CMV(t)). Then, the target image is adjusted based on CMV(t). Thereby, the target image is stabilized.

For actual applications, in step S32, AGMV(t) can be calculated based on the following equation:

$$AGMV(t)=AGMV(t-1)+GMV(t) \qquad \text{(Equation 2)}$$

In the equation above, GMV(t) represents a global motion vector of the target image. GMV(t) can be generated by gathering statistic of the local motion vectors of plural blocks in the target image. For instance, in the histogram of the local motion vectors, the local motion vector with largest amount can be selected as GMV(t) of target image. In the video stream, the target image follows a previous image. The parameters t and (t−1) represent a timing relationship. AGMV(t−1) in Equation 2 is corresponding to a previous accumulated motion vector of the previous image.

On the other side, in the low-pass filtering procedure of step S34, a filtered vector (FAGMV(t)) of the target image can be generated based on the following equation:

$$FAGMV(t)=K*FAGMV(t-1)+(1-K)*AGMV(t) \qquad \text{(Equation 3)}$$

FAGMV(t−1) in Equation 3 represents a previous filtered vector of the previous image. Further, K is a filter parameter. Through adjusting K, the degree of filtering off high frequency component in this low-pass filtering procedure can be controlled. In this embodiment, K can be set as 0.95. Subsequently, the final motion vector (CMV(t)) can be generated based on the following equation:

$$CMV(t)=AGMV(t)-FAGMV(t) \qquad \text{(Equation 4)}$$

CMV(t) in Equation 4 is a factor of adjusting the target image. For instance, if CMV(t) calculated in Equation 4 is "three pixels toward right", the target image will be adjusted toward left with the distance equal to three pixels in step S36.

Figure 3B:
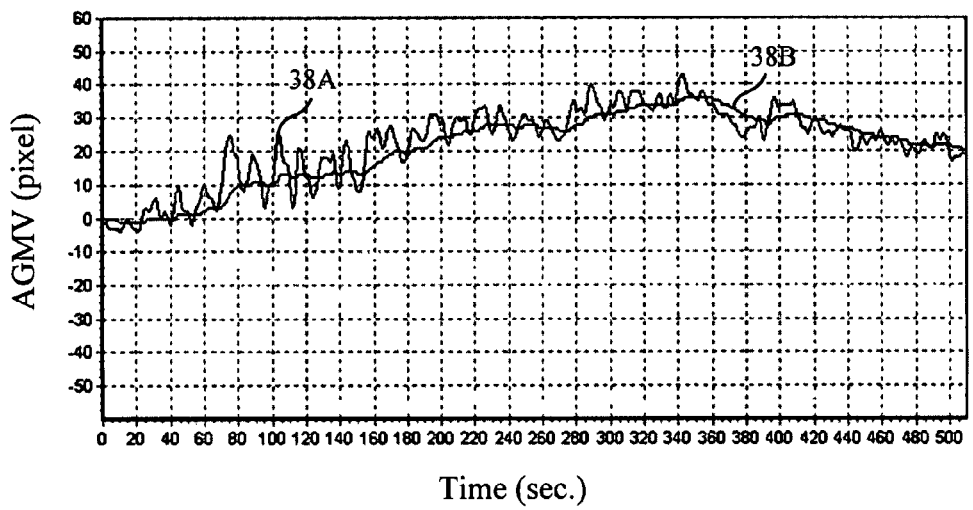
FIG. 3(B) shows examples of the ACMV before and after filtering.

FIG. 3(B) shows examples of the ACMV before and after filtering. The line 38A and line 38B represent the ACMV of a video stream before and after being adjusted by an image stabilization mechanism, respectively. As shown in FIG. 3(B), after the low-pass filtering procedure, high frequency component due to shaking in AGMV would be filtered off and low frequency component corresponds to movements would be retained. In other words, after being adjusted by the image stabilization method according to the invention, the uncomfortable feeling when watching shaking motion pictures can be substantially reduced while movements of the photographer can still be faithfully presented.

Figure 4A:
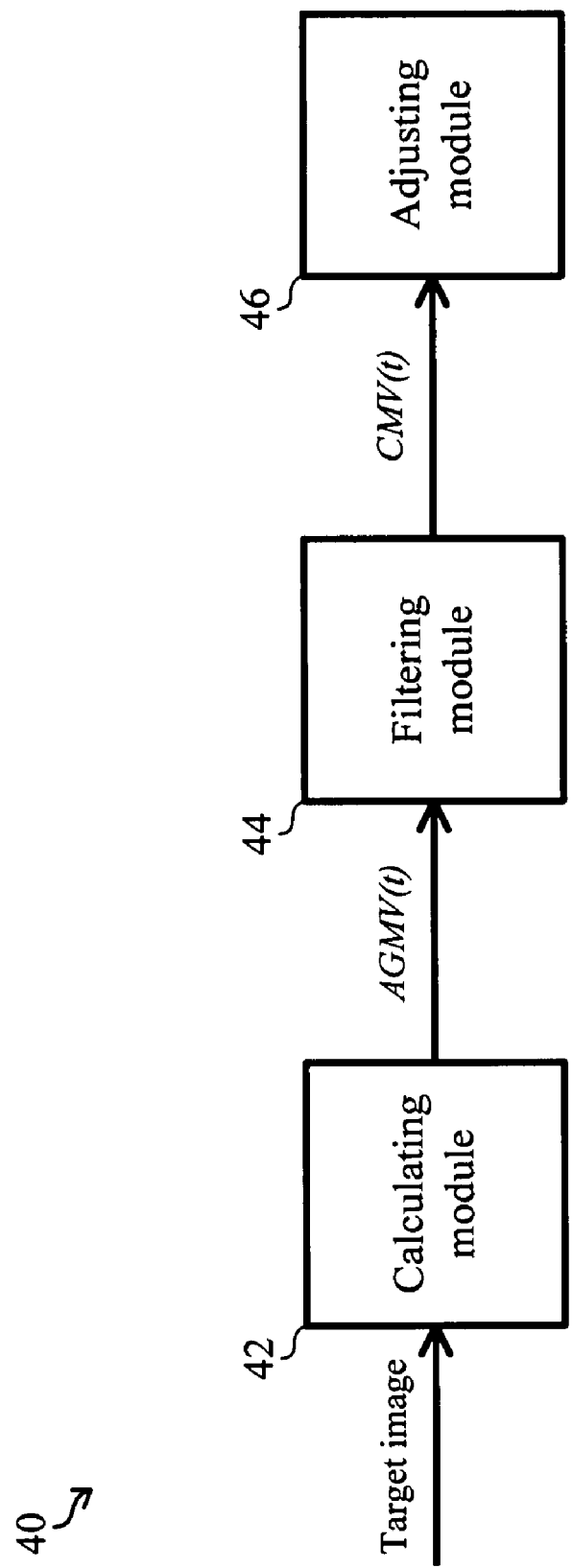
FIG. 4(A) illustrates the block diagram of the image stabilization apparatus in the second embodiment according to the invention.

The second embodiment, according to the invention, is an image stabilization apparatus for processing a target image in a video stream. Please refer to FIG. 4(A), which illustrates the block diagram of this apparatus. The image stabilization apparatus 40 includes a calculating module 42, a filtering module 44, and an adjusting module 46. The calculating module 42 is used for calculating a target accumulated motion vector (AGMV(t)) corresponding to the target image. The filtering module 44 is used for performing a low-pass filtering procedure on AGMV(t) to generate a final motion vector (CMV(t)). Then, the adjusting module 46 adjusts the target image based on CMV(t).

Figure 4B:
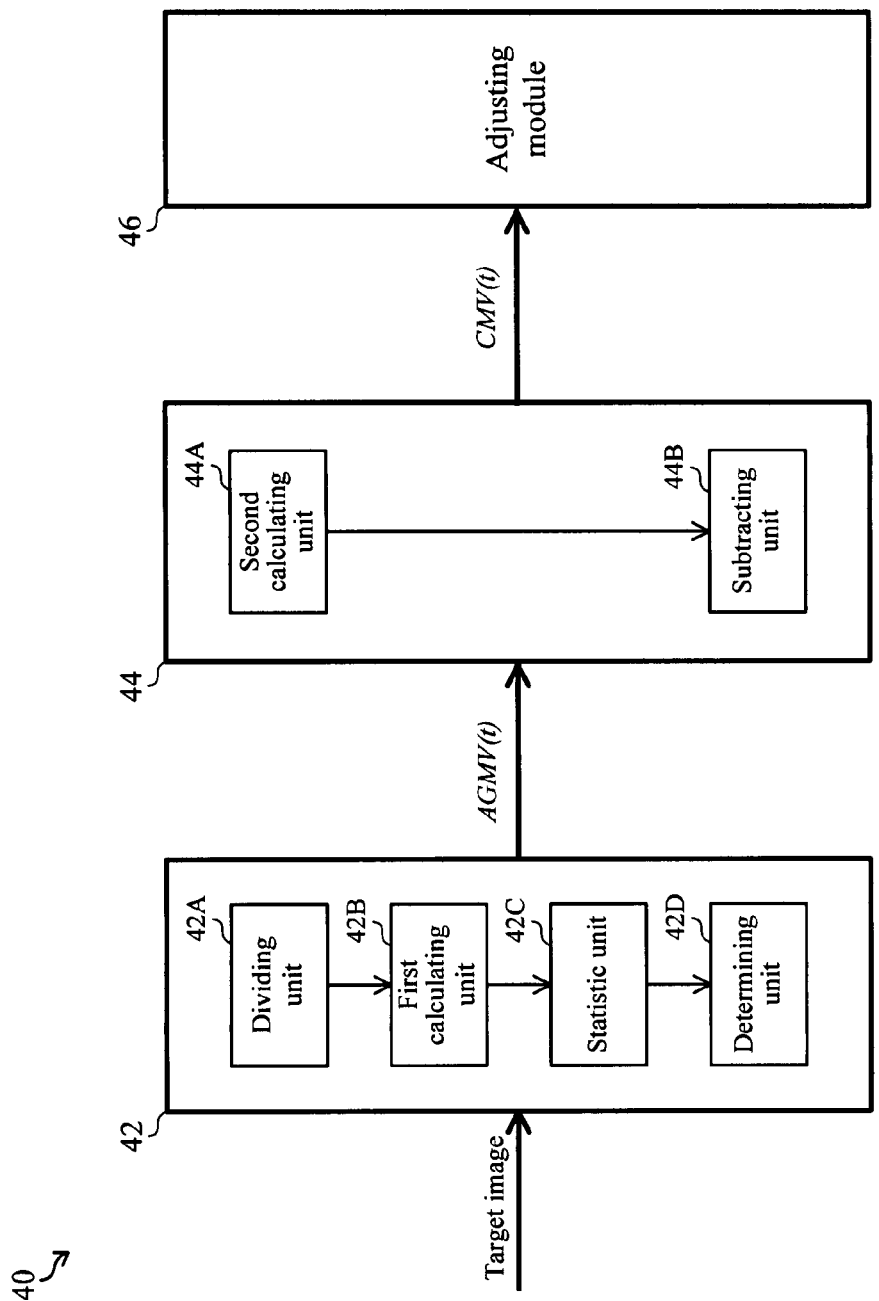
FIG. 4(B) illustrates an example of the detailed blocks of the image stabilization apparatus in FIG. 4(A).

FIG. 4(B) illustrates an example of the detailed blocks in the image stabilization apparatus 40. As shown in FIG. 4(B), the calculating module 42 includes a dividing unit 42A, a first calculating unit 42B, a statistic unit 42C, and a determining unit 42D.

The dividing unit 42A is used for dividing the target image into plural blocks. The first calculating unit 42B is used for respectively calculating a local motion vector for each of the blocks. Based on the local motion vectors of the plural blocks, the statistic unit 42C generates a statistic result. Then, the determining unit 42D determines a target global motion vector (GMV(t)) based on the statistic result and generate AGMV(t) for the target image according to Equation 2.

As shown in FIG. 4(B), the filtering module 44 can include a second calculating unit 44A and a subtracting unit 44B. The second calculating unit 44A is used for generating a filtered vector (FAGMV(t)) based on Equation 3. The subtracting unit 44B is used for generating the final motion vector (CMV(t)) based on Equation 4.

The third embodiment, according to the invention, is an image stabilization method for processing a video stream comprising a target image. Please refer to FIG. 5, which illustrates the flowchart of the method. In this embodiment, a digital video recorder provides at least two stabilization procedures.

Figure 5:
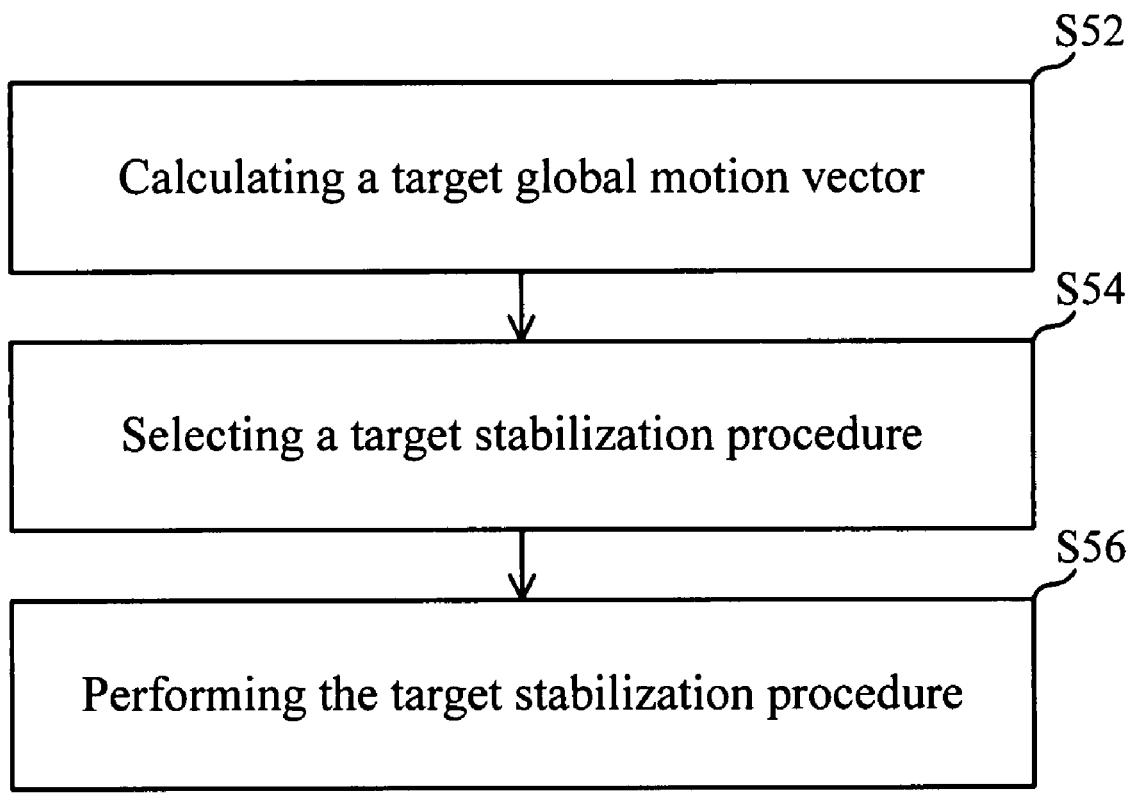
FIG. 5 illustrates the flowchart of the image stabilization method in the third embodiment according to the invention.

As shown in FIG. 5, in step S52, a target global motion vector (GMV(t)) of the target image is first calculated. In step S54, from at least two stabilization procedures, a target stabilization procedure is selected based on a judging mechanism. Then, in step S56, the target stabilization procedure is performed on the video stream.

Assume the target image is behind a previous image in the video stream. A target accumulated motion vector (AGMV(t)) can be calculated based on GMV(t) and a previous accumulated motion vector (AGMV(t−1)) of the previous image. For actual applications, in step S54, a vector difference between AGMV(t) and AGMV(t−1) can be calculated, and the target stabilization procedure can be selected based on the vector difference.

Figure 1A:
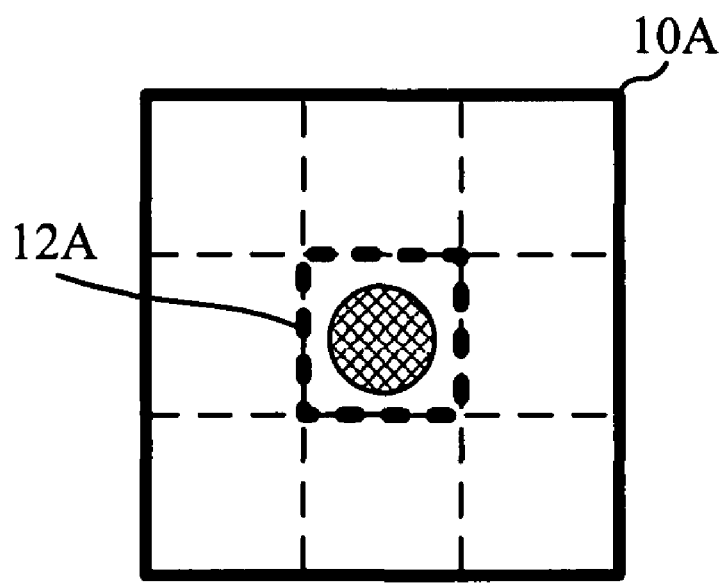
Figure 1B:
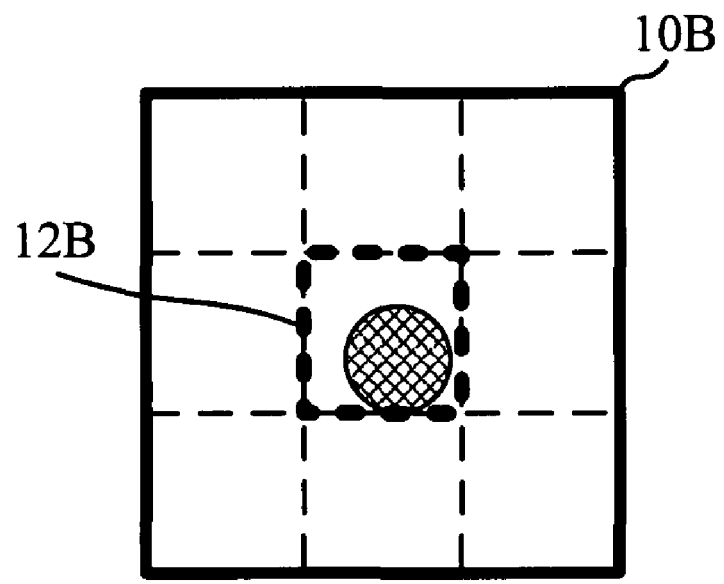
Figure 2A:
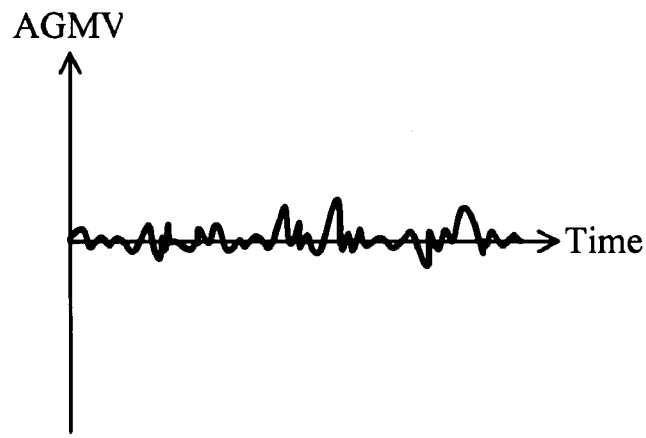
Figure 2B:
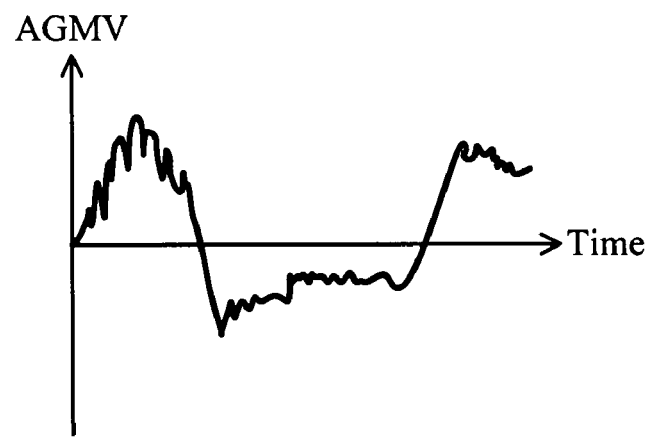
Figure 2C:
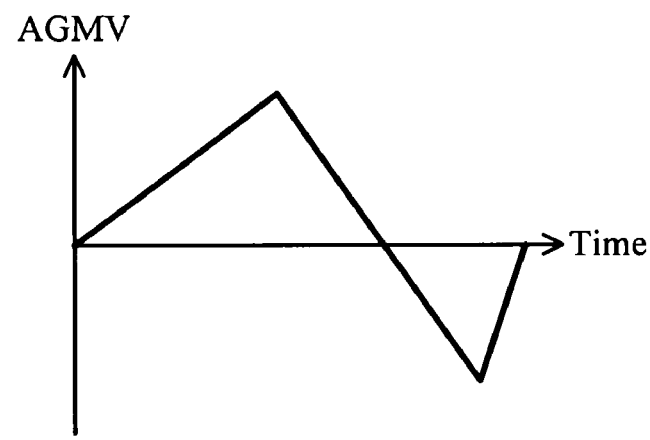

If the vector difference is larger than a predetermined value, it is indicated that the digital video recorder might be substantially moved as shown in FIG. 2(B) and FIG. 2(C). Under this condition, the method according to the invention can adopt a stabilization procedure directed against movement. On the contrary, if the vector difference is smaller than the predetermined value, it is indicated that the digital video recorder might be unintentionally shaken but not substantially moved (e.g. the conditions shown in FIG. 2(A)). Under this condition, the method according to the invention can adopt a stabilization procedure directed against shakes.

Further, in step S54, the target stabilization procedure can also be directly selected based on GMV(t) alone or the vector difference between a predetermined vector and GMV(t). If the digital video recorder is only slightly shaken and not substantially moved, the GMV of the video stream taken by the digital video recorder will be distributed within a specific range. If the GMV exceeds the range, it is possible the digital video recorder is substantially moved by the user.

Referring to the condition shown in FIG. 2(A), according to the invention, a first stabilization procedure can be adopted. In this procedure, CMV(t) is calculated based on the following equation:

$$CMV(t)=AGMV(t)=AGMV(t-1)+GMV(t) \quad \text{(Equation 5)}$$

AGMV(t) represents a target accumulated motion vector of the target image. AGMV(t−1) represents a previous accumulated motion vector of a previous image. GMV(t) represents the target global motion vector of the target image. The first stabilization procedure can adjust the target image based on CMV(t).

Referring to the condition shown in FIG. 2(B), according to the invention, a second stabilization procedure can be adopted. In this procedure, CMV(t) can be calculated based on Equations 2~4.

Referring to the condition shown in FIG. 2(C), according to the invention, a third stabilization procedure can be adopted. In this procedure, it is first judged whether a previous global motion vector (GMV(t−1)) is positive or negative. If GMV(t−1) is larger than zero, 1 is subtracted from GMV(t−1) to generate a final motion vector (CMV(t)). On the contrary, if GMV(t−1) is smaller than zero, 1 is added with GMV(t−1) to generate CMV(t). Thereby, CMV(T) of the video stream can be gradually converged to zero.

The fourth embodiment, according to the invention, is an image stabilization apparatus for processing a video stream. The video stream includes a target image and a previous image followed by the target image. Please refer to FIG. 6(A), which illustrates the block diagram of the image stabilization apparatus. In this embodiment, a digital video recorder provides at least two stabilization procedures.

Figure 6A:
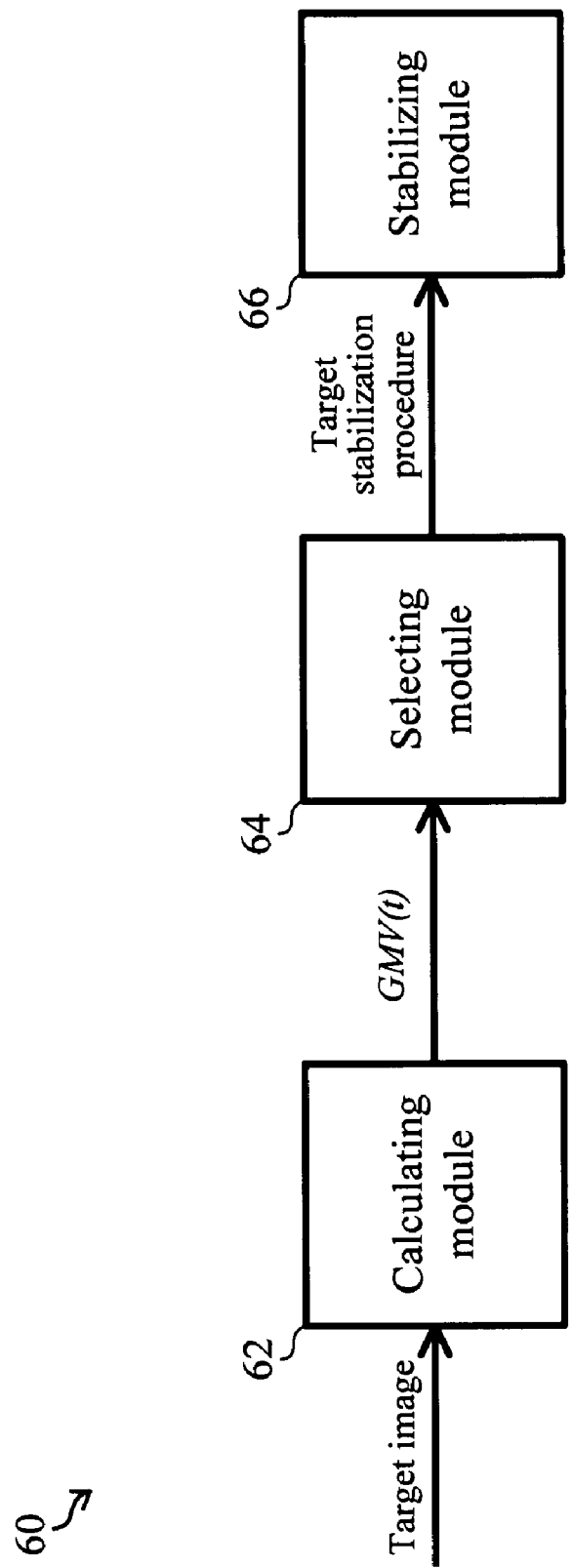
FIG. 6(A) illustrates the block diagram of the image stabilization apparatus in the fourth embodiment according to the invention.

As shown in FIG. 6(A), the image stabilization apparatus 60 includes a calculating module 62, a selecting module 64, and a stabilizing module 66. The calculating module is used for calculating a target global motion vector (GMV(t)) of the target image. The selecting module 64 is used for selecting a target stabilization procedure from the at least two stabilization procedures based on a judging mechanism. Then, the stabilizing module 66 performs the target stabilization procedure on the video stream.

Figure 6B:
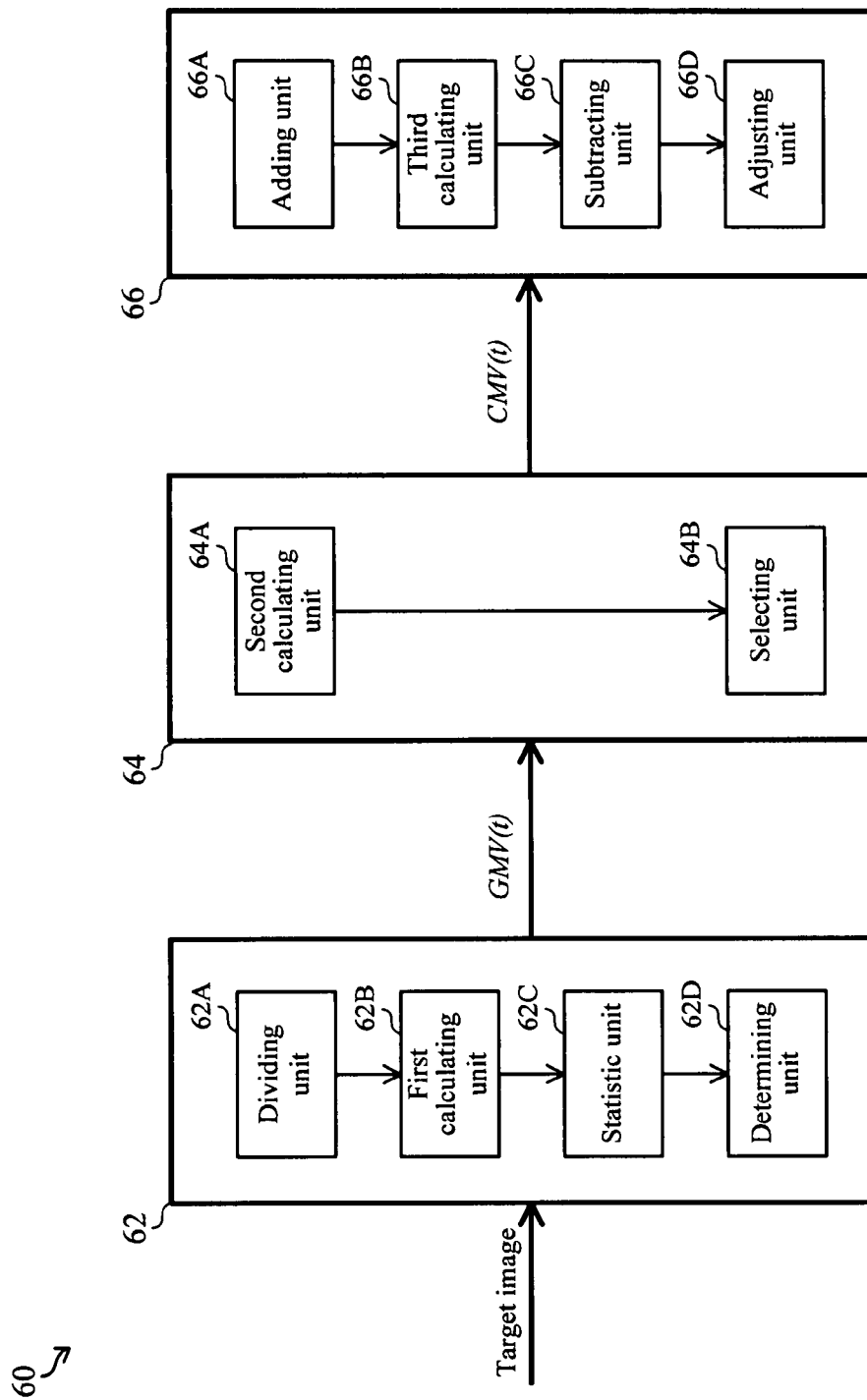
FIG. 6(B) illustrates an example of the detailed blocks in the image stabilization apparatus in FIG. 6(A).

FIG. 6(B) illustrates an example of the detailed blocks in the image stabilization apparatus 60. As shown in FIG. 6(B), the calculating module 62 includes a dividing unit 62A, a first calculating unit 62B, a statistic unit 62C, and a determining unit 62D.

The dividing unit 62A is used for dividing the target image into plural blocks. The first calculating unit 62B respectively calculates a local motion vector for each of the blocks. Then, the statistic unit 62C generates a statistic result based on the local motion vectors of the plural blocks. Subsequently, the determining unit 62D determines the target global motion vector (GMV(t)) based on the statistic result and calculates A GMV(t) corresponding the target image based on Equation 2.

As shown in FIG. 6(B), the selecting module can include a second calculating unit 64A and a selecting unit 64B. According to GMV(t) and a previous accumulated motion vector (AGMV(t−1)), a target accumulated motion vector (AGMV(t)) of the target image can be calculated. The second calculating unit 64A is used for calculating a vector difference between AGMV(t) and AGMV(t−1), or between GMV(t) and a predetermined vector. The selecting unit 64B is used for selecting the target stabilization procedure based on the vector difference.

Moreover, as shown in FIG. 6(B), the stabilizing module 66 can include an adding unit 66A, a third calculating unit 66B, a subtracting unit 66C, and an adjusting unit 66D. Referring to the condition shown in FIG. 2(A), the stabilizing module 66 can first calculate a final motion vector (CMV(t)) according to Equation 5 by the adding unit 66A. Then, the adjusting unit 66D adjusts the target image based on CMV(t).

Referring to the condition shown in FIG. 2(B), the stabilizing module 66 can first perform Equation 2 by the adding unit 66A to generate a target accumulated motion vector (AGMV(t)). Then, the third calculating unit 66B generates a filtered vector (FAGMV(t)) according to Equation 3. Subsequently, the subtracting unit 66C calculates CMV(t) according to Equation 4 and the adjusting unit 66D adjusts the target image based on CMV(t).

Referring to the condition shown in FIG. 2(C), if a previous global motion vector (GMV(t−1)) of the previous image is larger than zero, the subtracting unit 66C subtracts 1 from GMV(t−1) to generate CMV(t). On the contrary, if GMV(t−1) is smaller than zero, the subtracting unit 66C adds 1 with GMV(t−1) to generate CMV(t). Subsequently, the adjusting unit 66D is used for adjusting the target image based on CMV(t).

As described above, in the methods and apparatuses according to the invention, the concept of low-pass filtering is adopted; shakes with high frequencies in AGMV are filtered off and movements with low frequencies are retained. Accordingly, the methods and apparatuses according to the invention can be utilized even when photographers move around. Moreover, in the methods and apparatuses according to the invention, more than two stabilization procedures can be provided. The methods and apparatuses can automatically select the most suitable stabilization procedure based on whether a digital video recorder is shaken and/or moved. Good image stabilization effects are therefore provided.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image stabilization method for processing a video stream comprising a target image, the method comprising the steps of:

(a) calculating a target global motion vector of the target image;

(b) from at least two stabilization procedures, selecting a target stabilization procedure based on a judging mechanism; and (c) performing the target stabilization procedure on the video stream;

wherein the at least two stabilization procedures comprise a second stabilization procedure, and the second stabilization procedure comprises:

(c1) adding the target global motion vector (GMV(t)) with a previous accumulated motion vector (AGMV(t−1)) to generate a target accumulated motion vector (AGMV(t));

(c2) calculating a filtered vector (FAGMV(t)) based on the following equation:

$$FAGMV(t)=K*FAGMV(t-1)+(1-K)*AGMV(t);$$

(c3) subtracting the filtered vector from the target accumulated motion vector to generate a final motion vector; and (c4) adjusting the target image based on the final motion vector;

wherein FAGMV(t−1) represents a previous filtered vector of a previous image, K is a filter parameter, t and (t−1) respectively represent the time corresponding to the target image and the previous image.

2. The image stabilization method of claim 1, wherein step (a) comprises:
- (a1)) dividing the target image into plural blocks;
- (a2) respectively calculating a local motion vector for each of the blocks;
- (a3) generating a statistic result based on the local motion vectors of the plural blocks; and
- (a4) determining the target global motion vector based on the statistic result.

3. The image stabilization method of claim 1, wherein the judging mechanism comprises:
- (b1) calculating the target accumulated motion vector based on the target global motion vector and the previous accumulated motion vector;
- (b2) calculating a vector difference between the target accumulated motion vector and the previous accumulated global motion vector; and
- (b3) selecting the target stabilization procedure based on the vector difference.

4. The image stabilization method of claim 1, wherein the judging mechanism comprises:
- (b1) calculating a vector difference between the target global motion vector and a predetermined vector; and
- (b2) selecting the target stabilization procedure based on the vector difference.

5. The image stabilization method of claim 1, wherein the at least two stabilization procedures comprise a first stabilization procedure, and the first stabilization procedure comprises:
- (c1') adding the target global motion vector with the previous accumulated motion vector to generate the final motion vector; and
- (c2) adjusting the target image based on the final motion vector.

6. The image stabilization method of claim 1, wherein the at least two stabilization procedures comprise a third stabilization procedure, and the third stabilization procedure comprises:
- (c1') if a previous global motion vector is larger than zero, subtracting 1 from the previous global motion vector to generate the final motion vector; if the previous global motion vector is smaller than zero, adding 1 to the previous global motion vector to generate the final motion vector; and
- (c2) adjusting the target image based on the final motion vector.

7. An image stabilization apparatus for processing a video stream comprising a target image, the apparatus comprising:
- a calculating module for calculating a target global motion vector of the target image;
- a selecting module for selecting a target stabilization procedure from at least two stabilization procedures based on a judging mechanism; and
- a stabilizing module for performing the target stabilization procedure on the video stream;
- wherein the at least two stabilization procedures comprise a second stabilization procedure, and for performing the second stabilization procedure, the stabilizing module comprises:
- a third calculating unit for calculating a target accumulated motion vector (AGMV(t)) based on the target global motion vector (GMV(t)) and a previous accumulated motion vector (AGMV(t−1)), and for calculating a filtered vector (FAGMV(t)) based on the following equation:

$$FAGMV(t)=K*FAGMV(t-1)+(1-K)*AGMV(t);$$

- a subtracting unit for subtracting the filtered vector from the target accumulated motion vector to generate a final motion vector; and
- an adjusting unit for adjusting the target image based on the final motion vector;
- wherein FAGMV(t−1) represents a previous filtered vector of a previous image, K is a filter parameter, t and (t−1) respectively represent the time corresponding to the target image and the previous image.

8. The image stabilization apparatus of claim 7, wherein the calculating module comprises:
- a dividing unit for dividing the target image into plural blocks;
- a first calculating unit for respectively calculating a local motion vector for each of the blocks;
- a statistic unit for generating a statistic result based on the local motion vectors of the plural blocks; and
- a determining unit for determining the target global motion vector based on the statistic result.

9. The image stabilization apparatus of claim 7, wherein the selecting module comprises:
- a second calculating unit for calculating the target accumulated motion vector based on the target global motion vector and the previous accumulated motion vector, and for calculating a vector difference between the target accumulated motion vector and the previous accumulated global motion vector; and
- a selecting unit for selecting the target stabilization procedure based on the vector difference.

10. The image stabilization apparatus of claim 7, wherein the selecting module comprises:
- a second calculating unit for calculating a vector difference between the target global motion vector and a predetermined vector; and
- a selecting unit for selecting the target stabilization procedure based on the vector difference.

11. The image stabilization apparatus of claim 7, wherein the at least two stabilization procedures comprise a first stabilization procedure, and for performing the first stabilization procedure, the stabilizing module comprises:
- an adding unit for adding the target global motion vector with the previous accumulated motion vector to generate the final motion vector; and
- an adjusting unit for adjusting the target image based on the final motion vector.

12. The image stabilization apparatus of claim 7, wherein the at least two stabilization procedures comprise a third stabilization procedure, and for performing the third stabilization procedure, the stabilizing module comprises:
- a subtracting unit, if a previous global motion vector is larger than zero, the subtracting unit subtracting 1 from the previous global motion vector to generate the final motion vector; if the previous global motion vector is smaller than zero, the subtracting unit adding 1 to the previous global motion vector to generate the final motion vector; and an adjusting unit for adjusting the target image based on the final motion vector.

* * * * *